(12) United States Patent
Albero et al.

(10) Patent No.: US 12,335,254 B2
(45) Date of Patent: Jun. 17, 2025

(54) MALICIOUS UNIVERSAL RESOURCE LOCATOR AND FILE DETECTOR AND RESPONSE ACTION ENGINE

(71) Applicant: BANK OF AMERICA CORPORATION, Charlotte, NC (US)

(72) Inventors: George Anthony Albero, Charlotte, NC (US); Elijah Clark, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 227 days.

(21) Appl. No.: 17/868,463

(22) Filed: Jul. 19, 2022

(65) Prior Publication Data

US 2024/0031355 A1 Jan. 25, 2024

(51) Int. Cl.
H04L 29/06 (2006.01)
H04L 9/40 (2022.01)

(52) U.S. Cl.
CPC .......... H04L 63/083 (2013.01); H04L 63/123 (2013.01); H04L 63/1416 (2013.01)

(58) Field of Classification Search
CPC .. H04L 63/123; H04L 63/083; H04L 63/1416
See application file for complete search history.

(56) References Cited

U.S. PATENT DOCUMENTS

| | | | |
|---|---|---|---|
| 5,822,432 A * | 10/1998 | Moskowitz | H04L 9/3247 380/54 |
| 8,667,069 B1 | 3/2014 | Connelly et al. | |
| 8,739,247 B2 | 5/2014 | Shen et al. | |
| 9,083,739 B1 | 7/2015 | Call et al. | |
| 10,476,662 B2 | 11/2019 | Yuan et al. | |
| 10,574,692 B2 | 2/2020 | Drake | |
| 10,749,884 B2 | 7/2020 | Bailey et al. | |
| 10,880,322 B1 * | 12/2020 | Jakobsson | H04L 51/08 |
| 11,093,475 B2 | 8/2021 | Schundelmeier et al. | |
| 11,323,464 B2 | 5/2022 | Jakobsson | |
| 11,349,840 B1 | 5/2022 | Lanjewar et al. | |
| 11,645,381 B2 | 5/2023 | Nassar et al. | |
| 2002/0143871 A1 * | 10/2002 | Meyer | G06Q 10/107 709/204 |
| 2005/0080860 A1 * | 4/2005 | Daniell | G06Q 10/107 709/206 |
| 2005/0091321 A1 * | 4/2005 | Daniell | H04L 51/212 709/206 |
| 2007/0094332 A1 * | 4/2007 | Cama | G06Q 30/02 709/206 |
| 2017/0230323 A1 * | 8/2017 | Jakobsson | H04L 63/18 |

(Continued)

*Primary Examiner* — Dao Q Ho
(74) *Attorney, Agent, or Firm* — Moore & Van Allen PLLC; Anup Iyer

(57) ABSTRACT

Detecting malicious/spoofed Universal Resource Locators (URLs) and/or files in received electronic mail (i.e., email) and, in response to detection, automatically taking responsive measures to prevent interaction/access to the malicious/spoofed URLs and/or files and/or limit, network-wide, the exposure to the malicious/spoofed URLs and/or files. Valid URLs and/or files are assigned a token, such as an alpha-numeric passcode or the like and the assigned token is verified upon receipt of the email by the intended recipient. In the event that the token cannot be verified or a token is not received for a URL or file, the automated responsive actions ensue.

14 Claims, 5 Drawing Sheets

(56) References Cited

U.S. PATENT DOCUMENTS

2018/0137300 A1* 5/2018 Shi .................. G06F 21/6218
2019/0164156 A1   5/2019 Lindemann
2020/0067861 A1   2/2020 Leddy et al.

* cited by examiner

MALICIOUS UNIVERSAL RESOURCE LOCATOR AND FILE DETECTOR AND RESPONSE ACTION ENGINE

FIELD OF THE INVENTION

The present invention is electronic communication security and, more specifically, detecting malicious universal resource locators (URLs) and files via assignment of tokens/passcodes for purposes of URL/file verification.

BACKGROUND

Malicious entities attempt to emulate intra-network entities (i.e., insiders, such as colleagues, employees or the like) by so-called "spoofing" an entity's email address to make it appear to the unknowing email recipient that they are receiving email from within the network (i.e., from a colleague). For example, the malicious entity may spoof the email address by making a single alphanumeric change to the domain name, which goes unrecognized by the unknowing email recipient. The intent of the malicious entity may be to have the unknowing email recipient respond to the email as a means of obtaining otherwise personal or private information. In other instances, the email may contain a Universal Resource Locator (URL) (i.e., hyperlink) and/or an executable file, which, when activated or accessed by the email recipient, cause malicious software (i.e., so-called "malware") to be downloaded and/or executed on the email recipient's computing device. Not unlike the email address of the sender, the URL and the file may be spoofed to be appear to the unknowing email recipient to be valid URL or file.

Therefore, a need exists to develop systems, methods, computer program products and the like that detect malicious/spoofed URLs and/or files at the email recipient end. The desired systems, methods, computer program products and the like should be especially suited to detect such malicious/spoofed URLs and files in emails that appear to be sent by intra-network entities (e.g., insiders, such as colleagues, employees or the like). Moreover, the desired systems, methods, computer program products and the like should provide for various automated response mechanisms in the event that a malicious/spoofed URL and/or file is detected, so as to attempt to prevent the email recipient from interacting with the URL or file and/or limit the amount of exposure that the malicious/spoofed URL and/file presents throughout the network (i.e., limit exposure to other users within the network).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a means of detecting malicious/spoofed Universal Resource Locators (URLs) and/or files in received electronic mail (i.e., email) and, in response to detection, automatically taking responsive measures to prevent interaction/access to the malicious/spoofed URLs and/or files and limit, network-wide, the exposure to the malicious/spoofed URLs and/or files. Specifically, the present invention provides for valid URLs and/or files to be assigned a token, such as an alpha-numeric passcode or the like and for the assigned token to verified upon receipt of the email by the intended recipient.

In specific embodiments of the invention, a token, such as a random password is assigned to (i) a URL being generated for purposes of inclusion within an inter-network email (i.e., an email in which the sender and the recipient both have the same domain name) or (ii) a file being attached to the inter-network email. In other specific embodiments of the invention, a token, such as a random passcode is assigned, at a gateway device, to a URL or a file that is being sent from an external entity (i.e., a sender outside of the network having a different domain name) and, in some embodiments, has been validated (i.e., checked to ensure that the URL address is consistent with the resource it purports to be associated with or the file stores what it is purported to store). The assigned token/passcode is stored in a database that associates the token/passcode with the corresponding URL or file. Additionally, the URL and/file are deactivated (i.e., inaccessible) in the email. Subsequently, the email and the assigned token/passcode are communicated to the email recipient and the token/passcode is verified (i.e., checked against the tokens/passcodes stored in the database to verify a match between the received token and the URL/file). Once verified, the URL/file is activated so that the email recipient can access the URL and/or file. Additionally, once verified, the email recipient may be presented with metadata associated with the URL or file, such as URL site/file contents, URL/file creator, data created and the like.

In the event that the token/passcode is not verified or a token passcode is not received for the URL or file, automated responsive actions may be taken, which may include, but are not limited to, removing the URL or file from the email, retracting the email, deactivating input or output devices or the email recipient's device, locking/quarantining the email recipient's device or the like. In this regard, automated responsive actions seek to prevent the email recipient from interacting with a seemingly malicious URL/file and limit the amount of exposure that the email may present to other email recipients within the network.

A system for electronic communication security defines first embodiments of the invention. The system includes a first computing platform having a first memory and one or more first computing processor devices in communication with the first memory. The first memory stores a security token assignment module that is executable by at least one of the one or more first computing processing devices. The security token assignment module is configured to detect (i) generation of an embedded Universal Resource Locator (URL) within a first electronic mail (email), and/or (ii) attachment of a file to the first email. The first email is being sent from a sender having a first email address of a first domain to a first recipient having a second email address of the first domain (i.e., the email is being sent intra-network). In response to detection, the security token assignment module is configured to assign one or more security tokens to the first email, each of the one or more security tokens corresponding to the embedded URL or the attached file detected in the first email. Further, the security token assignment module stores the one or more assigned security tokens in a database that associates a security token with a corresponding embedded URL or attached file, and initiates communication of the one or more assigned security tokens to the first recipient. Moreover, the security token assignment module inactivates (i.e., makes inaccessible) the at least one of the embedded URL and attached file prior to the email being communicated to the first recipient.

The system additionally includes a second computing platform having a second memory and one or more second computing processor devices in communication with the second memory. The second memory stores a URL/file verification module that is executable by at least one of the one or more computing processing devices. The URL/file verification module is configured to, in response to the first recipient receiving (i) the one or more assigned security tokens, and (ii) the first email, attempt to verify an authenticity of the at least one of the embedded URL and the attached file by comparing the received one or more assigned security tokens to assigned security tokens stored in the database. In response to determining matches for each of the received one or more assigned security tokens and the assigned security stored in the database, the URL/file verification is configured to activate the previously inactive URL and/or file (i.e., make the URL and/or file accessible to the first recipient).

In additional specific embodiments the system further includes a gateway computing platform having a third memory and one or more third computing processor devices in communication with the third memory. The third memory stores the security token assignment module that is executable by at least one of the third computing processor devices and further configured to detect at least one chosen from the group consisting of (i) an embedded Universal Resource Locator (URL) within a second electronic mail (email), and (ii) an attached file included with the second email. The second email is being sent from a sender having an email address of a second domain to second recipient having a third email address of the first domain (i.e., the email is being sent from an external entity, i.e., a domain that is different than the email recipient's domain). In response to detection of the embedded URL and/or attached file, the security token assignment module is configured to (i) assign one or more second security tokens to the second email, each of the one or more security tokens corresponding to one of the embedded URL or the attached file detected in the second email, (ii) store the one or more second assigned security tokens in the database, and (iii) communicate the one or more second assigned security tokens to the second recipient. Additionally, security token assignment module is configured to provide for inactivation of the at least one of the embedded URL and the attached file prior to communicating the second email to the second recipient. In related embodiments of the system, the URL/file verification module is further configured to, in response to the second recipient receiving (i) the one or more second assigned security tokens, and (ii) the first email, attempt to verify an authenticity of the at least one of the embedded URL and the attached file in the second email by comparing the received one or more second assigned security tokens to the assigned security tokens stored in the database. In response to determining matches for each of the received one or more second assigned security tokens and the assigned security stored in the database, the URL/file verification module is configured to activate the URL and/or the file in the second email, so that the second recipient can access the network location and/or file contents.

In specific embodiments of the system, the security token assignment module is further configured to communicate the one or more assigned security tokens to the first recipient by including or embedding the one or more assigned security tokens in the first email. In specific related embodiments of the system, the URL/file verification module is further configured to, in response to the first recipient interacting with (e.g., hovering over with the pointer or the like) the embedded URL or attached file, visually or audibly present the corresponding one of the one or more assigned security tokens to the first recipient, and receive first recipient input of the corresponding one of the one or more assigned security tokens to initiate the attempt to verify the authenticity of the corresponding embedded URL or the corresponding attached file. In other embodiments of the system, the security token assignment module is further configured to communicate the one or more assigned security tokens to the first recipient in a communication other than the first email (e.g., a separate text/Short Message Service (SMS) message or the like).

In other specific embodiments of the system, the URL/file verification module is further configured to, in response to determining matches for each of the received one or more second assigned security tokens and the assigned security stored in the database, presenting the first recipient with URL metadata or file metadata, wherein URL metadata includes site contents, URL creator and URL creation date and file metadata includes file contents, file creator and file creation date.

In further specific embodiments of the system, in response to failing to determine matches for each of the received one or more assigned security tokens and the assigned security stored in the database, provide for one or more of (i) auto-forwarding the first email to one or more suspicious activity reporting entities, (ii) deleting at least one of the embedded URL and attached file from the email, (iii) disabling at least one of one or more inputs mechanisms (e.g., mouse, keyboard/pad or the like) and one or more output mechanisms (e.g., display or the like) on a user device on which the first recipient is using to view the first email, and (iv) quarantine (i.e., locking), for a predetermined period of time, a user device on which the first recipient is using to view the first email.

A computer-implemented method for electronic communication security defines second embodiments of the invention. The computer-implemented method is executable by one or more computing processor devices. The method includes detecting at least one chosen from the group consisting of (i) generation of an embedded Universal Resource Locator (URL) within a first electronic mail (email), and (ii) attachment of a file to the first email. The first email is being sent from a sender having a first email address of a first domain to a first recipient having a second email address of the first domain (i.e., the first email is being sent intra-network). The computer-implemented method further includes (i) assigning one or more security tokens to the first email, each of the one or more security tokens corresponding to one of the embedded URL or the attached file detected in the first email, (ii) storing the one or more assigned security tokens in a database that associates a security token with a corresponding embedded URL or attached file, and (iii) communicating the one or more assigned security tokens to the first recipient. The computer-implemented method further includes communicating the first email to the first recipient with the at least one of the embedded URL and attached file being in an inactive state (i.e., inaccessible state). In response to the first recipient receiving (i) the one or more assigned security tokens, and (ii) the first email, the computer-implemented method further includes attempting to verify an authenticity of the at least one of the embedded URL and the attached file by comparing the received one or more assigned security tokens to the assigned security tokens stored in the database. In response to determining matches for each of the received one or more assigned security tokens and the assigned security stored in the database, the computer-implemented method includes moving the at least one of the embedded URL and the attached file in the first email from the inactive state to an active state.

In specific embodiments the computer-implemented method further includes detecting at least one chosen from the group consisting of (i) an embedded Universal Resource Locator (URL) within a second electronic mail (email), and (ii) an attached file included with the second email. The second email is being sent from a sender having an email address of a second domain to second recipient having a third email address of the first domain (i.e., the email is being sent from an external entity, i.e., a domain that is different than the email recipient's domain). The specific embodiment of the computer-implemented method further includes assigning one or more second security tokens to the second email, each of the one or more security tokens corresponding to one of the embedded URL or the attached file detected in the second email, storing the one or more second assigned security tokens in the database, and communicating the one or more second assigned security tokens to the second recipient. Further, the computer-implemented method includes communicating the second email to the second recipient with the at least one of the embedded URL and the attached file being in an inactive state. In response to the second recipient receiving (i) the one or more second assigned security tokens, and (ii) the first email, the computer-implemented method further includes attempting to verify an authenticity of the at least one of the embedded URL and the attached file by comparing the received one or more second assigned security tokens to the assigned security tokens stored in the database, and, in response to determining matches for each of the received one or more second assigned security tokens and the assigned security stored in the database, moving the at least one of the embedded URL and the attached file in the second email from the inactive state to an active state.

In specific embodiments of the computer-implemented method, communicating the one or more second assigned security tokens to the second recipient further comprises one selected from the group consisting of (i) including or embedding the one or more assigned security tokens in the first email, and (ii) including the one or more assigned security tokens in a communication other than the first email (i.e., separate email, text/SMS message or the like).

In other specific embodiments the computer-implemented method further includes, in response to determining matches for each of the received one or more second assigned security tokens and the assigned security stored in the database, presenting the first recipient with URL metadata or file metadata, that includes site/file contents, URL/file creator and URL/file creation date.

In still further specific embodiments the computer-implemented method further includes, in response to failing to determine matches for each of the received one or more assigned security tokens and the assigned security stored in the database, performing at least one chosen from the group consisting of (i) auto forwarding the first email to one or more suspicious activity reporting entities, (ii) deleting at least one of the embedded URL and attached file from the email, (iii) disabling at least one of one or more inputs mechanisms and one or more output mechanisms on a user device on which the first recipient is using to view the first email, and (iv) quarantining (i.e., locking), for a predetermined period of time, a user device on which the first recipient is using to view the first email.

A computer program product including a non-transitory computer-readable medium defines third embodiments of the invention. The computer-readable medium includes a first set of codes for causing a computer to detect at least one chosen from the group consisting of (i) generation of an embedded Universal Resource Locator (URL) within a first electronic mail (email), and (ii) attachment of a file to the first email. The first email is being sent from a sender having a first email address of a first domain to a first recipient having a second email address of the first domain (i.e., intra-network email). The computer-readable medium additionally includes a second set of codes for causing a computer to (i) assign one or more security tokens to the first email, each of the one or more security tokens corresponding to the embedded URL or the attached file detected in the first email, (ii) store the one or more assigned security tokens in a database that associates security tokens with a corresponding embedded URL or attached file, and (iii) communicate the one or more assigned security tokens to the first recipient. Further, the computer-readable medium includes a third set of codes for causing a computer to initiate communication of the first email to the first recipient with the at least one of the embedded URL and attached file being in an inactive state. Additionally, the computer-readable medium includes a fourth set of codes for causing a computer to, in response to the first recipient receiving (i) the one or more assigned security tokens, and (ii) the first email, attempt to verify an authenticity of the at least one of the embedded URL and the attached file by comparing the received one or more assigned security tokens to the assigned security tokens stored in the database. Moreover, the computer-readable medium includes a fifth set of codes for causing a computer to, in response to determining matches for each of the received one or more assigned security tokens and the assigned security stored in the database, move the at least one of the embedded URL and the attached file in the first email from the inactive state to an active state.

In specific embodiments of the computer program product, the second set of codes are further configured to cause the computer to (iii) communicate the one or more assigned security tokens to the first recipient by (i) including or embedding the one or more assigned security tokens in the first email, or (ii) including the one or more assigned security tokens in a communication other than the first email.

In other specific embodiments of the computer program product, the computer-readable medium further includes a sixth set of codes for causing a computer to, in response to determining matches for each of the received one or more second assigned security tokens and the assigned security stored in the database, present the first recipient with URL/file metadata including site/file contents, URL/file creator and URL/file creation date.

In still further specific embodiments of the computer program product, the computer-readable medium further includes a sixth set of codes for causing a computer to, in response to failing to determine matches for each of the received one or more assigned security tokens and the assigned security stored in the database, perform at least one chosen from the group consisting of (i) auto forwarding the first email to one or more suspicious activity reporting entities, (ii) deleting at least one of the embedded URL and attached file from the email, (iii) disabling at least one of one or more inputs mechanisms and one or more output mechanisms on a user device on which the first recipient is using to view the first email, and (iv) quarantining, for a predetermined period of time, a user device on which the first recipient is using to view the first email.

Thus, according to embodiments of the invention, which will be discussed in greater detail below, the present invention provides for detecting malicious/spoofed Universal Resource Locators (URLs) and/or files in received electronic mail (i.e., email) and, in response to detection, automatically taking responsive measures to prevent interaction/access to the malicious/spoofed URLs and/or files and limit, network-wide, the exposure to the malicious/spoofed URLs and/or files. Valid URLs and/or files are assigned a token, such as an alpha-numeric passcode or the like and the assigned token is verified upon receipt of the email by the intended recipient. In the event that the token can not be verified or a token is not received for a URL or file, the automated responsive actions ensue.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
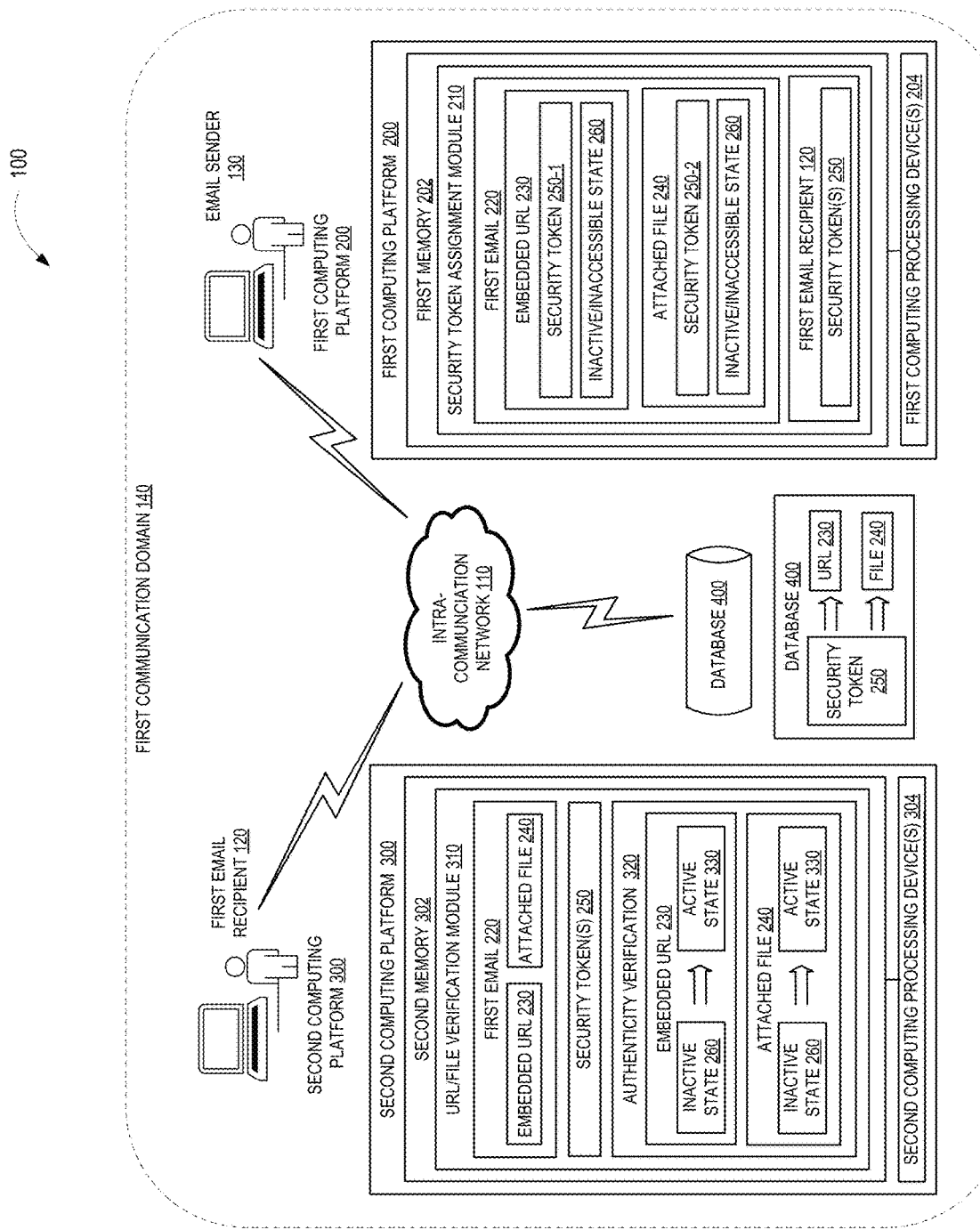
Figure 2:
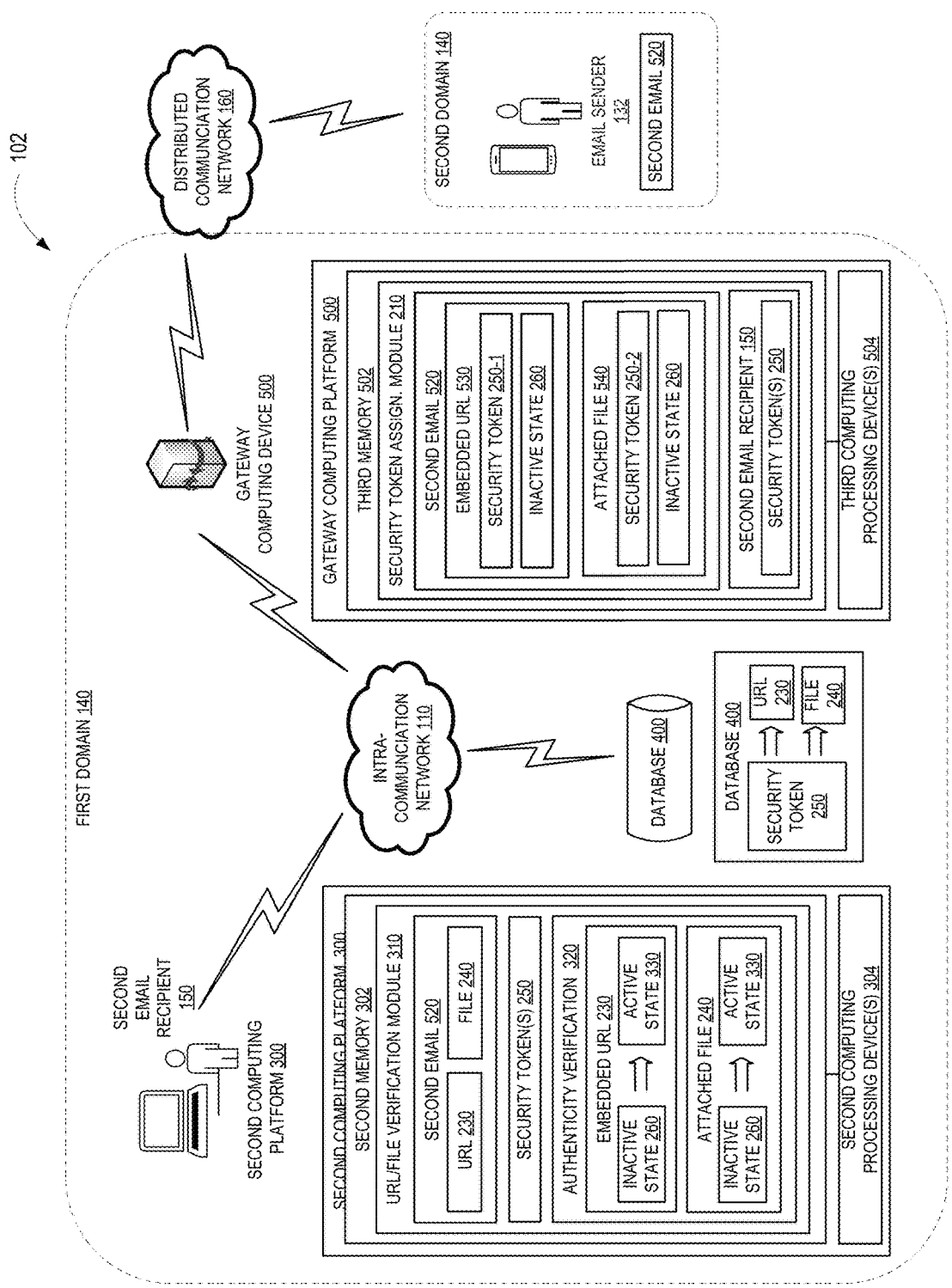
Figure 3:
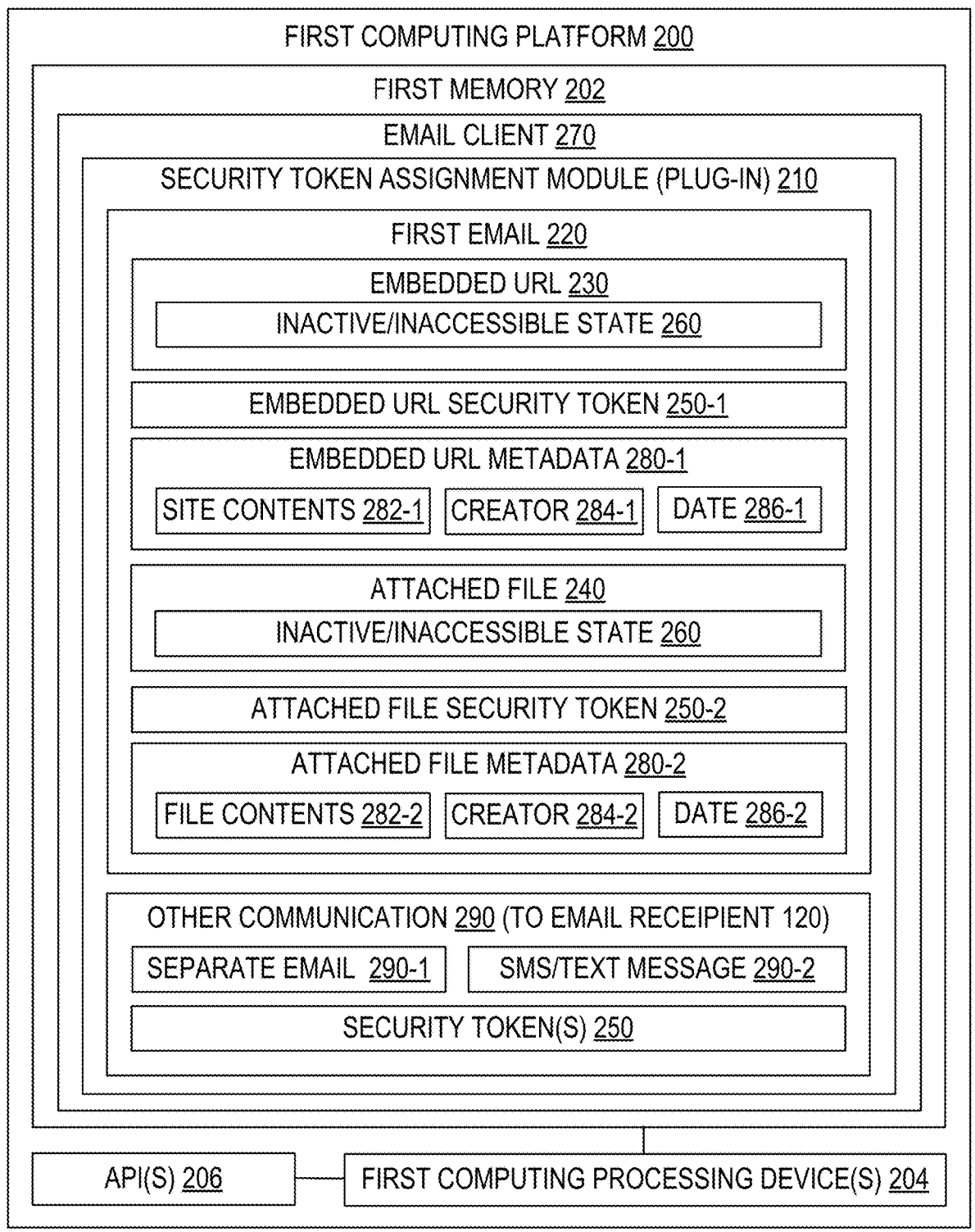
Figure 4:
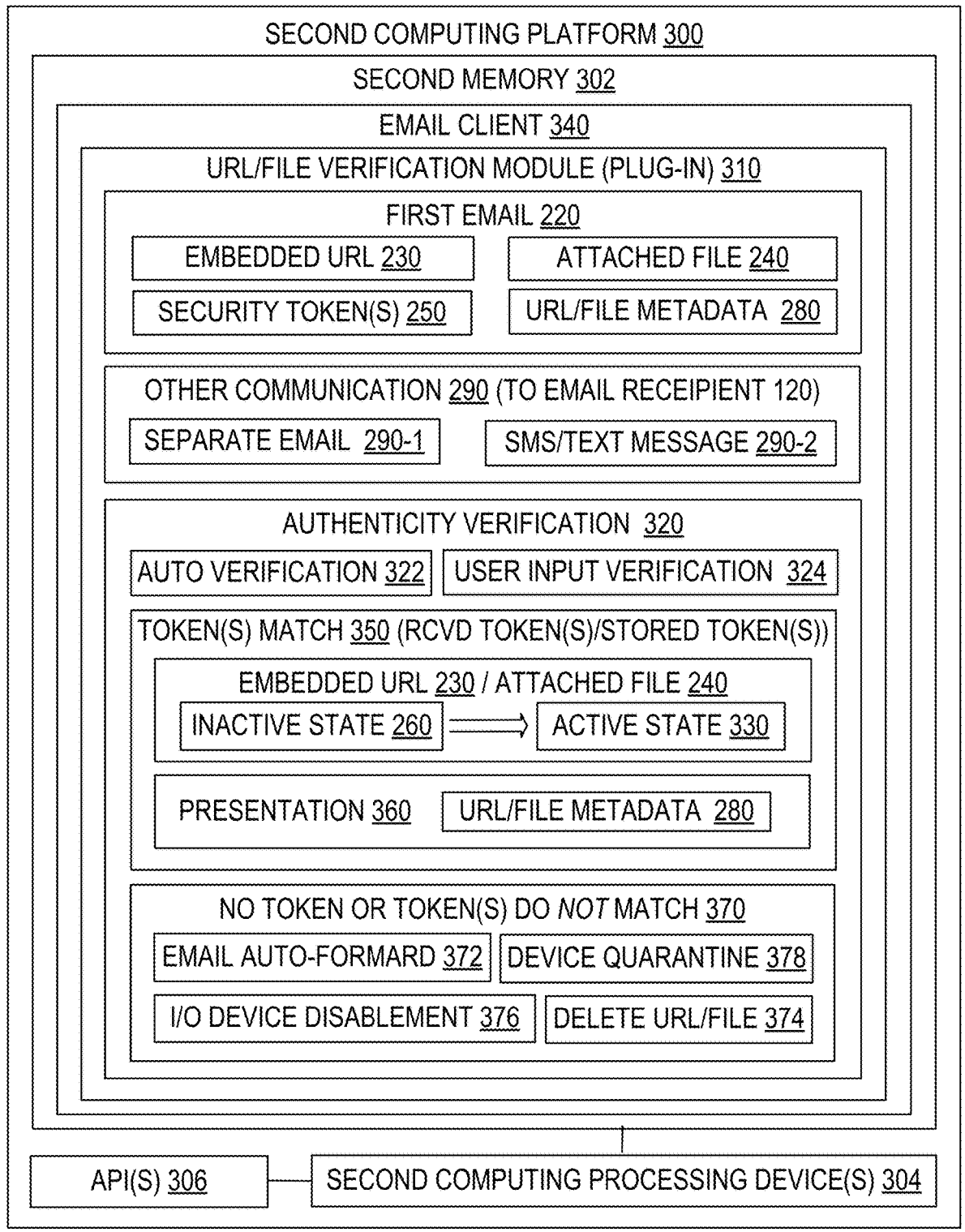
Figure 5:
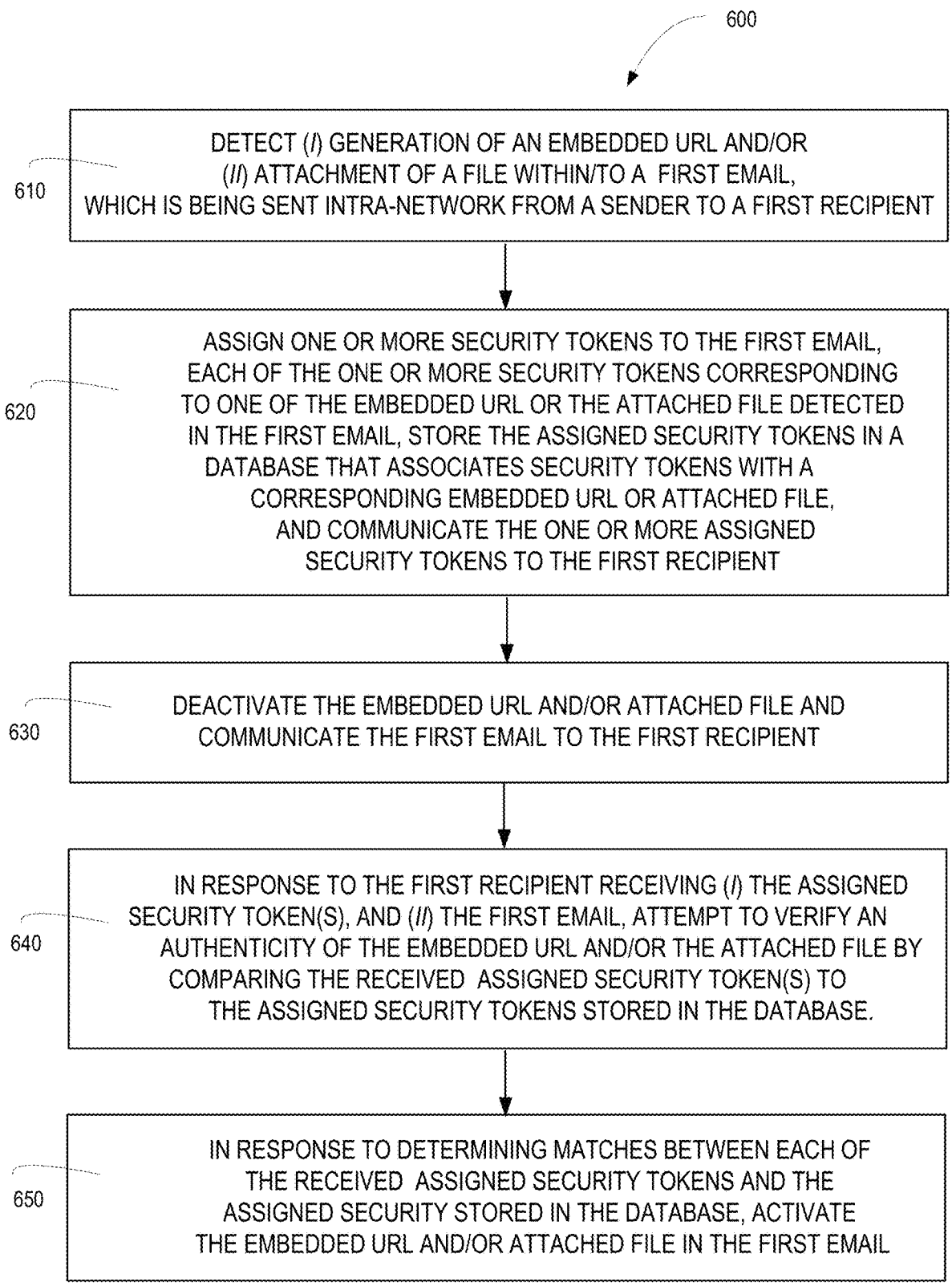

Having thus described embodiments of the disclosure in general terms, reference will now be made to the accompanying drawings, wherein:

FIG. 1 is a schematic/block diagram of a system for electronic communication security for intra-network electronic communication, in accordance with embodiments of the present invention;

FIG. 2 is a schematic/block diagram of a system for electronic communication security for both intra-network and externally received electronic communication, in accordance with some embodiments of the present disclosure;

FIG. 3 is a block diagram of a first computing device configured for assigning tokens to Universal Resource Locators (URLs) and/or files included within or attached to emails, in accordance with some embodiments of the present disclosure;

FIG. 4 is block diagram of a second computing device configured for verifying the authenticity of a URL or attached file in an email, in accordance with some embodiments of the present disclosure; and FIG. 5 is a flow diagram of a computer-implemented method for electronic communication security; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that providing for a means of detecting malicious/spoofed Universal Resource Locators (URLs) and/or files in received electronic mail (i.e., email) and, in response to detection, automatically taking responsive measures to prevent interaction/access to the malicious/spoofed URLs and/or files and limit, network-wide, the exposure to the malicious/spoofed URLs and/or files. Specifically, the present invention provides for valid URLs and/or files to be assigned a token, such as an alpha-numeric passcode or the like and for the assigned token to verified upon receipt of the email by the intended recipient.

In specific embodiments of the invention, a token, such as a random password is assigned to (i) a URL being generated for purposes of inclusion within an inter-network email (i.e., an email in which the sender and the recipient both have the same domain name) or (ii) a file being attached to the inter-network email. In other specific embodiments of the invention, a token, such as a random passcode is assigned, at a gateway device, to a URL or a file that is being sent from an external entity (i.e., a sender outside of the network having a different domain name) and, in some embodiments, has been validated (i.e., checked to ensure that the URL address is consistent with the resource it purports to be associated with or the file stores what it is purported to store). The assigned token/passcode is stored in a database that associates the token/passcode with the corresponding URL or file. Additionally, the URL and/file are deactivated (i.e., inaccessible) in the email. Subsequently, the email and the assigned token/passcode are communicated to the email recipient and the token/passcode is verified (i.e., checked against the tokens/passcodes stored in the database to verify a match between the received token and the URL/file). Once verified, the URL/file is activated so that the email recipient can access the URL and/or file. Additionally, once verified, the email recipient may be presented with metadata associated with the URL or file, such as URL site/file contents, URL/file creator, data created and the like.

In the event that the token/passcode is not verified or a token passcode is not received for the URL or file, automated responsive actions may be taken, which may include, but are not limited to, removing the URL or file from the email, retracting the email, deactivating input or output devices or the email recipient's device, locking/quarantining the email recipient's device or the like. In this regard, automated responsive actions seek to prevent the email recipient from interacting with a seemingly malicious URL/file and limit the amount of exposure that the email may present to other email recipients within the network.

Referring to FIG. 1, shown is a system 100 for electronic communication security, in accordance with embodiments of the present invention. The system 100 operates exclusively with a first communication domain 140, which means that the electronic communication occurs within an intra-communication network 110 (i.e., both the email sender 130 and the first email recipient have the same domain address, i.e., first communication domain address).

System 100 includes a first computing platform 200, which may comprise a user device of the email sender 130. First computing platform 200 includes first memory 202 and one or more first computing processor devices 204 in communication with first memory 202. First memory 202 stores security token assignment module 210 which may be a plug-in module of an email client or the like. Security token assignment module 210 is executable by at least one of the one or more first computing processor devices 204 and is configured to detect generation of an embedded Universal Resource Locator (URL) 230 within a first email 220 and/or a file 240 attached to the first email. The first email 220 being sent from email sender 130 to first email recipient 120, which, as previously discussed, are both within first communication domain 140. In response to detecting generation of the embedded URL 230 within first email 220 or attachment of the file 240 to first email 220, security token assignment module 210 is configured to assign one or more security tokens 250 to the first email, such as security token 250-1 corresponding to the embedded URL 230 and/or security token 250-2 corresponding to the attached file 240.

In response to assigning the security token(s) 250, security token assignment module 210 is configured to store security token(s) in database 400, which is in communication with first computing platform 200 via intra-communication network 110 and associates a security token 250 with a corresponding embedded URL 230 or attached file 240.

In addition, once assigned, security token assignment module 210 is configured to provide for communication of the assigned security token(s) to the first recipient. In specific embodiments of the system 100, the assigned security token(s) are communicated to the first email recipient 120 along with the first email 220, such that the first email recipient 120 receives the security token(s) 250 concurrently with the first email 220. In other embodiments of the invention, the security tokens may be communicated to the first email recipient 120 via a separate electronic communication, such as another email or a text/Short Message Service (SMS) message or the like.

Moreover, once assigned, security token assignment module 210 is configured provide for the embedded URL 230 and/or attached file 240 to be in an inactive/inaccessible state 260 prior to initiating communication of the first email 220 to the first email recipient.

System 100 additionally includes second computing platform 300, which may comprise a user device of the first email recipient 120. Second computing platform 300 includes second memory 302 and one or more second computing processor devices 304 in communication with second memory 302. Second memory 302 stores URL/file verification module 310, which may be a plug-in module of an email client or the like. URL/file verification module 310 is executable by at least one of the one or more second computing processor devices 304 and is configured to, in response to the first email recipient 120 receiving (i) the assigned security token(s) 250 and (ii) the first email 220, attempt to verify the authenticity of the embedded URL 230 and/or attached file 240 by comparing the received assigned security token(s) 250 to the assigned security tokens 250 stored in the database 400. In response to determining a match in the database 400 for the received assigned security token(s) 250 and the embedded URL 230 and/or attached file 240, URL/file verification module 310 is configured to move the embedded URL 230 and/or attached file 240 from the inactive state 260 to an active state 330, in which the embedded URL 230 or attached file 240 is accessible to the first email recipient 120.

Referring to FIG. 2, shown is a system 102 for electronic communication security, in accordance with alternate embodiments of the present invention. The system 102 operates in conjunction with the system 100 shown and described in relation to FIG. 1.

System 102 includes a gateway computing platform 500 that includes third memory 502 and one or more third computing processor devices 504 in communication with first memory 202. Third memory 502 stores security token assignment module 210, which is executable by at least one of the one or more third first computing processor devices 504 operates similarly to the security token assignment module 210 shown in FIG. 1. Security token assignment module 210 and is configured to detect an embedded Universal Resource Locator (URL) 530 within a second email 520 and/or a file 540 attached to the second email. The second email 520 being sent from external email sender 132 having an email domain address associated with second domain 140, which is different than the email domain address of first domain 140 (i.e., the domain in which the gateway computing platform 500 resides). In response to detecting an embedded URL 530 within second email 220 or an attached file 540 attached to second email 520, security token assignment module 210 is configured to assign one or more security tokens 250 to the second email, such as security token 250-1 corresponding to the embedded URL 530 and/or security token 250-2 corresponding to the attached file 540.

In specific embodiments of the system 102, the assignment of the security token(s) may occur after validating the embedded URL 530 and/or attached file 540. In such embodiments of the system 102, validation of the embedded URL 530 and/or attached file 540 may entail ensuring that the embedded URL is associated with a non-malicious site and/or that the attached file 540 stores what the file purports to store absent any malicious executables, such as malware or the like. Such, verifications may be performed by containerizing the embedded URL or file and accessing the resource or activating the file and/or by analyzing the metadata associated with the URL or file.

In response to assigning the security token(s) 250, security token assignment module 210 is configured to store security token(s) in database 400, which is in communication with gateway computing platform 500 via intra-communication network 110 and associates a security token 250 with a corresponding embedded URL 230 or attached file 240.

In addition, once assigned, security token assignment module 210 is configured to provide for communication of the assigned security token(s) to the second email recipient 150. In specific embodiments of the system 100, the assigned security token(s) are communicated to the second email recipient 150 along with the second email 520, such that the second email recipient 150 receives the security token(s) 250 concurrently with the second email 520. In other embodiments of the invention, the security tokens may be communicated to the second email recipient 150 via a separate electronic communication, such as another email or a text/Short Message Service (SMS) message or the like.

Moreover, once assigned, security token assignment module 210 is configured provide for the embedded URL 230 and/or attached file 240 to be in an inactive/inaccessible state 260 prior to initiating communication of the second email 220 to the second email recipient 150.

System 102 additionally includes second computing platform 300 configured for URL/file verification, which was previously discussed in relation to FIG. 1.

Referring to FIG. 3, a block diagram is presented of first computing platform 200 configured for assignment of security tokens (e.g., random passcodes) to URLs and attached files, in accordance with embodiments of the present invention. In addition to providing greater details of the first computing platform 200, FIG. 3 highlights various alternate embodiments of the invention. First computing platform 200 may comprise one or multiple devices, such as personal computing devices or the like that are in wired and/or wireless communication with one another. First computing platform 200 includes first memory 202, which may comprise volatile and non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service.

Further, first computing platform 200 includes one or more first computer processing devices 204, which may be an application-specific integrated circuit ("ASIC"), or other chipset, logic circuit, or other data processing device. First computing processing device(s) 204 may execute one or more application programming interface (APIs) 206 that interface with any resident programs, such as security token assignment module 210 or the like, stored in first memory 202 of first computing platform 200 and any external programs. First computing processing devices(s) 204 may include various processing subsystems (not shown in FIG. 3) embodied in hardware, firmware, software, and combinations thereof, that enable the functionality of first computing platform 200 and the operability of first computing platform 200 on a network, such as the intranet(s), Internet, cellular network(s) and the like. For example, processing subsystems allow for initiating and maintaining communications and exchanging data with other networked devices. For the disclosed aspects, processing subsystems of first computing platform 200 may include any subsystem used in conjunction with security token assignment module 210 and related tools, routines, sub-routines, algorithms, sub-algorithms, sub-modules thereof.

In specific embodiments of the present invention, first computing platform 200 may additionally include a communications module (not shown in FIG. 3) embodied in hardware, firmware, software, and combinations thereof, that enables electronic communications between the first computing platform 200 and other networks and network devices, such as second computing platform 300, database 400 and the like. Thus, communication module may include the requisite hardware, firmware, software and/or combinations thereof for establishing and maintaining a network communication connection with one or more devices and/or networks.

First memory 202 of first computing platform 200 stores security token assignment module 210, which may be a plug-in module associated with an email client 270 or the like. Security token assignment module 210 is executable by one or more of the first computing processing devices 204 and is configured to detect generation of an embedded Universal Resource Locator (URL) 230 within a first email 220 and/or an attached file 240 attached to the first email 220. The first email 220 being sent from email sender 130 to first email recipient 120, which, as previously discussed, are both within first communication domain 140 (shown in FIG. 1). As such, the security token assignment module 210 may additionally configured to detect that an addressee of the first email 220 is one that is located in first communication domain 140 (i.e., the same email address domain as the email sender).

In response to detecting generation of the embedded URL 230 within first email 220 or attachment of the file 240 to first email 220 and, in some embodiments, that the email recipient is intra-network (i.e., same email address domain as the email sender), security token assignment module 210 is configured to assign one or more security tokens 250 to the first email, such as security token 250-1 corresponding to the embedded URL 230 and/or security token 250-2 corresponding to the attached file 240.

In response to assigning the security token(s) 250, security token assignment module 210 is configured to store security token(s) in database 400 (shown in FIG. 1), which is in communication with first computing platform 200 via intra-communication network 110 and associates a security token 250 with a corresponding embedded URL 230 or attached file 240.

In addition, once assigned, security token assignment module 210 is configured to provide for communication of the assigned security token(s) to the first recipient. In specific embodiments of the system 100, the assigned security token(s) are communicated to the first email recipient 120 along with the first email 220, such that the first email recipient 120 receives the security token(s) 250 concurrently with the first email 220. In other embodiments of the invention, the security tokens may be communicated to the first email recipient 120 via a separate electronic communication 290, such as another separate email 29-1 or a text/Short Message Service (SMS) message 290-2 or the like.

Additionally, security token assignment module 210 is configured to include embedded URL metadata 280-1 and/or attached file metadata 280-2 with the first email 220. The embedded URL metadata 280-1 and/or attached file metadata 280-2 is configured to be presented to the first email recipient 120 upon verification of the authenticity of the embedded URL 230 and/or attached file 240. The embedded URL metadata 280-1 may include, but is not limited to, URL site contents 282-1, URL creator identification 284-1 and URL creation date/time 286-1. The attached file metadata 280-2 may include, but is not limited to, file site contents 282-2, file creator identification 284-2 and file creation date/time 286-2.

Moreover, once assigned, security token assignment module 210 is configured provide for the embedded URL 230 and/or attached file 240 to be in an inactive/inaccessible state 260 prior to initiating communication of the first email 220 to the first email recipient.

Referring to FIG. 4, a block diagram is presented of second computing platform 300 configured for URL/file verification, in accordance with embodiments of the present invention. In addition to providing greater details of the second computing platform 300, FIG. 4 highlights various alternate embodiments of the invention. Second computing platform 300 may comprise one or multiple devices, such as personal computing devices or the like that are in wired and/or wireless communication with one another. Second computing platform 300 includes second memory 302, which may comprise volatile and non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, second computing platform 300 includes one or more second computer processing devices 304, which may be an application-specific integrated circuit ("ASIC"), or other chipset, logic circuit, or other data processing device. Second computing processing device(s) 304 may execute one or more application programming interface (APIs) 306 that interface with any resident programs, such as URL/file verification module 310 or the like, stored in second memory 302 of second computing platform 300 and any external programs. Second computing processing devices(s) 304 may include various processing subsystems (not shown in FIG. 4) embodied in hardware, firmware, software, and combinations thereof, that enable the functionality of second computing platform 300 and the operability of second computing platform 300 on a network, such as the intranet(s), Internet, cellular network(s) and the like. For example, processing subsystems allow for initiating and maintaining communications and exchanging data with other networked devices. For the disclosed aspects, processing subsystems of second computing platform 300 may include any subsystem used in conjunction with URL/file verification module 310 and related tools, routines, sub-routines, algorithms, sub-algorithms, sub-modules thereof.

In specific embodiments of the present invention, second computing platform 300 may additionally include a communications module (not shown in FIG. 4) embodied in hardware, firmware, software, and combinations thereof, that enables electronic communications between the second computing platform 300 and other networks and network devices, such as first computing platform 200, database 400 and the like. Thus, communication module may include the requisite hardware, firmware, software and/or combinations thereof for establishing and maintaining a network communication connection with one or more devices and/or networks.

Second memory 302 of second computing platform 300 stores URL/file verification module 310, which may be a plug-in module associated with an email client 340 or the like. URL/file verification module 310 is executable by one or more of the second computing processing devices 304 and is configured to, in response to the first email recipient 120 receiving (i) the assigned security token(s) 250 and (ii) the first email 220, attempt authenticity verification 320 of the embedded URL 230 and/or attached file 240 by comparing the received assigned security token(s) 250 to the assigned security tokens 250 stored in the database 400. As previously discussed, the security tokens 250 may be received in the first email 220 or in other communications 290 to the email recipient 120, such as separate email 290-1, SMS/text message 290-2 or the like.

Authenticity verification 320 may comprises auto verification 322, in which the security code(s) communicated within the first email 220 are automatically subjected to verification attempts upon receipt of the first email 220 or upon the email recipient 120 opening the first email 220. In other embodiments of the invention, authenticity verification 320 comprises user input verification 324, which requires the user to input the security token/passcode for the verification attempt to occur. For example, the user recipient may interact with the URL or file (e.g., right-click, hover over or the like) in order for the security token to be presented to the user. The user may record the security token/passcode or perform a copy function and subsequently insert/enter the security token/passcode in a designated entry field.

In response to determining a match in the database 400 for the received assigned security token(s) 250 and the embedded URL 230 and/or attached file 240, URL/file verification module 310 is configured to move the embedded URL 230 and/or attached file 240 from the inactive state 260 to an active state 330, in which the embedded URL 230 or attached file 240 is accessible to the first email recipient 120. In additional embodiments of the invention, determining a match (i.e., successful verification of the URL or file) results in presentation 360 of the URL and/or file metadata 280.

In response to determining no match 370 in the database 400 for the received assigned security token(s) 250 and the embedded URL 230 and/or attached file 240 or no token 370 associated with the URL 230 and/or attached file 240, the URL/file verification module 310 (or an associated automated response engine) is configured to conduct automated responses, including, but not limited to, auto-forwarding 372 of the email to predetermined entities responsible for further suspicious email investigation, deletion 374 of the URL/file from the email, retraction of the email, disablement 376 of input devices (e.g., mouse, keyboard/keypad or the like) and/or output devices (e.g., display/monitor or the like) on the email recipient's device for a predetermined period of time (while investigation is ongoing) and/or quarantining/locking 378 of the email recipient's device for a predetermined period of time.

Referring to FIG. 5, a flow diagram is depicted of a method 600 for electronic communication security, in accordance with embodiments of the present invention. At Event 610, generation of an embedded URL or attachment of a file within an email and, in some embodiments, addressing of the email to an internal (i.e., intra-network) email recipient is detected. In this regard, the email is being sent from an email sender having a first email address associated with a first email domain to an email recipient having a second email address associated with the same email domain.

At Event 620, (i) security tokens, such as random pass codes or the like are assigned to the embedded URLs and/or attached files, each security token corresponding to one URL or one file, (ii) the assigned security tokens are stored in database that associates the security token with the corresponding URL and/or attached file, and (iii) the assigned security tokens are communicated to the email recipient. In specific embodiments of the method, the security tokens are communicated along with the corresponding email or, in other embodiments of the method, in separate communications, such as separate email, text message or the like.

At Event 630, the assignment of the security tokens to the URLs and/or files, provides for deactivation of the embedded URLs and attached files prior to communicating the email to the email recipient. In this regard, the embedded URLs and or attached files remain inaccessible to the email recipient until the URLs and/or files are verified through presentation and verification of the corresponding security token(s).

In response to the email recipient receiving the assigned security tokens and the email, at Event 640, verification of the authenticity of the URLs and files is attempted by comparing the received security tokens to the stored security tokens corresponding to the URLs and/or files in the database.

In response to determining a match between the received security token(s) and the assigned security tokens stored in the database, at Event 650, the embedded URL and/or attached file is activated to allow for the email recipient to access the resources associated with the URL or contents stored in the file. In additional embodiments, determining a match also provides for presentation of URL and/or file metadata, such as contents, creator, date of creation and the like. In the event that that no match is determined or the URL or file fails to be associated/include a security token, automated responsive actions may be invoked, such as, but not limited to, deleting the URL/file from the email, auto-forwarding the email to predetermined entities, retracting the email, disabling input and/or output devices on the email recipient's device, quarantining/locking the email recipient's device for a predetermined period of time and the like.

Thus, present embodiments of the invention provide devices, methods, computer program products and/or the like detecting malicious/spoofed Universal Resource Locators (URLs) and/or files in received electronic mail (i.e., email) and, in response to detection, automatically taking responsive measures to prevent interaction/access to the malicious/spoofed URLs and/or files and limit, network-wide, the exposure to the malicious/spoofed URLs and/or files. Valid URLs and/or files are assigned a token, such as an alpha-numeric passcode or the like and the assigned token is verified upon receipt of the email by the intended recipient. In the event that the token cannot be verified or a token is not received for a URL or file, the automated responsive actions ensue.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronic communication security, the system comprising:

a first computing platform having a first memory and one or more first computing processor devices in communication with the first memory, wherein the first memory stores a security token assignment module that is (i) executable by at least one of the one or more first computing processor devices and (ii) configured to:

detect at least one chosen from the group consisting of (i) an embedded Universal Resource Locator (URLs) within a first electronic mail (email), and (ii) attachment of a file to the first email, wherein the first email is being sent from a sender having a first email address of a first domain to a first recipient having a second email address of the first domain, in response to detecting the least one of the embedded URL and the attachment of the file, assign one or more security tokens to the first email, each of the one or more security tokens corresponding to the embedded URL or the attached file detected in the first email, wherein the security token is a passcode, store the one or more assigned security tokens in a database, wherein the database associates a security token with a corresponding embedded URL or attached file, provide for communication of the one or more assigned security tokens to the first recipient in a communication other than the first email comprising a Short Message Service (SMS) message or another email, in response to detecting the least one of the embedded URL and the attachment of the file, inactivate the at least one of the embedded URL and attached file;

a second computing platform having a second memory and one or more second computing processor devices in communication with the second memory, wherein the second memory stores a URL/file verification module that is (i) executable by at least one of the one or more computing processor devices and (ii) configured to:

in response to the first recipient receiving (i) the one or more assigned security tokens, and (ii) the first email, attempt to verify an authenticity of the at least one of the embedded URL and the attached file by comparing the received one or more assigned security tokens to the assigned security tokens stored in the database, in response to determining matches for each of the received one or more assigned security tokens and the assigned security tokens stored in the database, activate the at least one of the embedded URL and the attached file in the first email, and in response to failing to determine matches for at least one of the received one or more assigned security tokens and the assigned security tokens stored in the database, auto-forward the first email to one or more suspicious activity reporting entities.

2. The system of claim 1, further comprising:
a gateway computing platform having a third memory and one or more third computing processor devices in communication with the third memory, wherein the third memory stores the security token assignment module that is (i) executable by at least one of the third computing processor devices and (ii) configured to:
detect at least one chosen from the group consisting of (i) an embedded Universal Resource Locator (URLs) within a second electronic mail (email), and (ii) an attached file included with the second email, wherein the second email is being sent from a sender having an email address of a second domain to second recipient having a third email address of the first domain,
assign one or more second security tokens to the second email, each of the one or more security tokens corresponding to the embedded URL or the attached file detected in the second email,
store the one or more second assigned security tokens in the database,
provide for communication of the one or more second assigned security tokens to the second recipient, and
inactive the at least one of the embedded URL and the attached file.

3. The system of claim 2, wherein the URL/file verification module is further configured to:
in response to the second recipient receiving (i) the one or more second assigned security tokens, and (ii) the first email, attempt to verify an authenticity of the at least one of the embedded URL and the attached file by comparing the received one or more second assigned security tokens to the assigned security tokens stored in the database, and in response to determining matches for each of the received one or more second assigned security tokens and the assigned security tokens stored in the database, activate the at least one of the embedded URL and the attached file in the second email.

4. The system of claim 1, wherein the URL/file verification module is further configured to:
in response to determining matches for each of the received one or more second assigned security tokens and the assigned security tokens stored in the database, presenting the first recipient with URL metadata or file metadata, wherein URL metadata includes site contents, URL creator and URL creation date and file metadata includes file contents, file creator and file creation date.

5. The system of claim 1, wherein the URL/file verification module is further configured to:
in response to failing to determine matches for each of the received one or more assigned security tokens and the assigned security tokens stored in the database, delete at least one of the embedded URL and attached file from the email.

6. The system of claim 1, wherein the URL/file verification module is further configured to:
in response to failing to determine matches for each of the received one or more assigned security tokens and the assigned security tokens stored in the database, disable at least one of one or more inputs mechanisms and one or more output mechanisms on a user device on which the first recipient is using to view the first email.

7. The system of claim 1, wherein the URL/file verification module is further configured to:
in response to failing to determine matches for each of the received one or more assigned security tokens and the assigned security tokens stored in the database, quarantine, for a predetermined period of time, a user device on which the first recipient is using to view the first email.

8. A computer-implemented method for electronic communication security, the computer-implemented method is executable by one or more computing processor devices, the method comprising:
detecting at least one chosen from the group consisting of (i) an embedded Universal Resource Locator (URL) within a first electronic mail (email), and (ii) attachment of a file to the first email, wherein the first email is being sent from a sender having a first email address of a first domain to a first recipient having a second email address of the first domain;
in response to detecting the least one of the embedded URL and the attachment of the file, assigning one or more security tokens to the first email, each of the one or more security tokens corresponding to the embedded URL or the attached file detected in the first email, wherein the security token is a passcode;
storing the one or more assigned security tokens in a database, wherein the database associates a security token with a corresponding embedded URL or attached file;
communicating the one or more assigned security tokens to the first recipient in a communication other than the first email comprising a Short Message Service (SMS) message or another email;

communicating the first email to the first recipient with the at least one of the embedded URL and attached file being in an inactive state;

in response to the first recipient receiving (i) the one or more assigned security tokens, and (ii) the first email, attempting to verify an authenticity of the at least one of the embedded URL and the attached file by comparing the received one or more assigned security tokens to the assigned security tokens stored in the database;

in response to determining matches for each of the received one or more assigned security tokens and the assigned security tokens stored in the database, moving the at least one of the embedded URL and the attached file in the first email from the inactive state to an active state; and in response to failing to determine matches for at least one of the received one or more assigned security tokens and the assigned security tokens stored in the database, auto-forwarding the first email to one or more suspicious activity reporting entities.

9. The computer-implemented method of claim 8, further comprising:

detecting at least one chosen from the group consisting of (i) an embedded Universal Resource Locator (URL) within a second electronic mail (email), and (ii) an attached file included with the second email, wherein the second email is being sent from a sender having an email address of a second domain to second recipient having a third email address of the first domain;

assigning one or more second security tokens to the second email, each of the one or more security tokens corresponding to the embedded URL or the attached file detected in the second email;

storing the one or more second assigned security tokens in the database;

communicating the one or more second assigned security tokens to the second recipient;

communicating the second email to the second recipient with the at least one of the embedded URL and the attached file being in an inactive state;

in response to the second recipient receiving (i) the one or more second assigned security tokens, and (ii) the first email, attempting to verify an authenticity of the at least one of the embedded URL and the attached file by comparing the received one or more second assigned security tokens to the assigned security tokens stored in the database, and in response to determining matches for each of the received one or more second assigned security tokens and the assigned security tokens stored in the database, moving the at least one of the embedded URL and the attached file in the second email from the inactive state to an active state.

10. The computer-implemented method of claim 8, further comprising:

in response to determining matches for each of the received one or more second assigned security tokens and the assigned security tokens stored in the database, presenting the first recipient with URL metadata or file metadata, wherein URL metadata includes site contents, URL creator and URL creation date and file metadata includes file contents, file creator and file creation date.

11. The computer-implemented method of claim 8, further comprising:

in response to failing to determine matches for each of the received one or more assigned security tokens and the assigned security tokens stored in the database, performing at least one chosen from the group consisting of (i) deleting at least one of the embedded URL and attached file from the email, (ii) disabling at least one of one or more inputs mechanisms and one or more output mechanisms on a user device on which the first recipient is using to view the first email, and (iii) quarantining, for a predetermined period of time, a user device on which the first recipient is using to view the first email.

12. A computer program product comprising:

a non-transitory computer-readable medium comprising:

a first set of codes for causing a computer to detect at least one chosen from the group consisting of (i) an embedded Universal Resource Locator (URL) within a first electronic mail (email), and (ii) attachment of a file to the first email, wherein the first email is being sent from a sender having a first email address of a first domain to a first recipient having a second email address of the first domain;

a second set of codes for causing a computer to in response to detecting the least one of the embedded URL and the attachment of the file, (i) assign one or more security tokens to the first email, each of the one or more security tokens corresponding to the embedded URL or the attached file detected in the first email, wherein the security token is a passcode, (ii) store the one or more assigned security tokens in a database, wherein the database associates a security token with a corresponding embedded URL or attached file, and (iii) communicate the one or more assigned security tokens to the first recipient in a communication other than the first email comprising a Short Message Service (SMS) message or another email;

a third set of codes for causing a computer to initiate communication of the first email to the first recipient with the at least one of the embedded URL and attached file being in an inactive state;

a fourth set of codes for causing a computer to, in response to the first recipient receiving (i) the one or more assigned security tokens, and (ii) the first email, attempt to verify an authenticity of the at least one of the embedded URL and the attached file by comparing the received one or more assigned security tokens to the assigned security tokens stored in the database;

a fifth set of codes for causing a computer to, in response to determining matches for each of the received one or more assigned security tokens and the assigned security tokens stored in the database, move the at least one of the embedded URL and the attached file in the first email from the inactive state to an active state; and a sixth set of codes for causing a computer to, in response to failing to determine matches for at least one of the received one or more assigned security tokens and the assigned security tokens stored in the database, auto-forward the first email to one or more suspicious activity reporting entities.

13. The computer program product of claim 12, wherein the computer-readable medium further comprises:

a seventh set of codes for causing a computer to, in response to determining matches for each of the received one or more second assigned security tokens and the assigned security tokens stored in the database, present the first recipient with URL metadata or file metadata, wherein URL metadata includes site contents, URL creator and URL creation date and file metadata includes file contents, file creator and file creation date.

14. The computer program product of claim 12, wherein the computer-readable medium further comprises:
   a seventh set of codes for causing a computer to, in response to failing to determine matches for each of the received one or more assigned security tokens and the assigned security tokens stored in the database, perform at least one chosen from the group consisting of (i) deleting at least one of the embedded URL and attached file from the email, (ii) disabling at least one of one or more inputs mechanisms and one or more output mechanisms on a user device on which the first recipient is using to view the first email, and (iii) quarantining, for a predetermined period of time, a user device on which the first recipient is using to view the first email.

* * * * *